(12) United States Patent
Zhang et al.

(10) Patent No.: US 11,143,357 B2
(45) Date of Patent: Oct. 12, 2021

(54) LED DISPLAY BOX TRANSPORT CART

(71) Applicant: SHENZHEN GLOSHINE TECHNOLOGY CO., LTD., Guangdong (CN)

(72) Inventors: Xianfeng Zhang, Guangdong (CN); Yongjun Zhang, Guangdong (CN); Guoqiang Li, Guangdong (CN); Jiawei Cao, Guangdong (CN)

(73) Assignee: SHENZHEN GLOSHINE TECHNOLOGY CO., LTD., Shenzhen (CN)

(*) Notice: Subject to any disclaimer, the term of this patent is extended or adjusted under 35 U.S.C. 154(b) by 331 days.

(21) Appl. No.: 16/476,550

(22) PCT Filed: May 6, 2019

(86) PCT No.: PCT/CN2019/085603
§ 371 (c)(1),
(2) Date: Jul. 8, 2019

(87) PCT Pub. No.: WO2020/062868
PCT Pub. Date: Apr. 2, 2020

(65) Prior Publication Data
US 2021/0262610 A1 Aug. 26, 2021

(30) Foreign Application Priority Data
Sep. 28, 2018 (CN) .......................... 201811136645.2

(51) Int. Cl.
*G09F 9/33* (2006.01)
*G09F 21/04* (2006.01)
(Continued)

(52) U.S. Cl.
CPC ............... *F16M 11/42* (2013.01); *G09F 9/33* (2013.01); *B62B 3/108* (2013.01); *G09F 21/048* (2013.01)

(58) Field of Classification Search
CPC .......... G09F 9/33; G09F 21/04; G09F 21/048; F16M 11/42; B62B 3/108; B60B 3/00; B65D 25/10
See application file for complete search history.

(56) References Cited

U.S. PATENT DOCUMENTS 1,894,022 A * 1/1933 Cruser .................. H04M 1/667
217/56
3,760,970 A * 9/1973 Lutz .................... B65D 21/0215
220/4.28
(Continued)

FOREIGN PATENT DOCUMENTS

| CN | 203978054 U | 12/2014 | |
|---|---|---|---|
| CN | 205971417 U | 2/2017 | |
| EP | 3702239 A1 * | 9/2020 | ............... B62B 3/04 |

*Primary Examiner* — Tan Le

(57) ABSTRACT

Provided is a LED display box transport cart comprising: a transport frame and wheels, the transport frame comprises a chassis, an upper cover and two side covers symmetrically arranged between chassis and upper cover; chassis is provided with an arcuate groove with an upward opening, the first edge of arcuate groove extends to second edge to form a groove edge; the lower end of side cover corresponding to the position of arcuate groove is provided with a hook, circular arc plate of hook is rotatably connected in arcuate groove, the lower edge of rectangular plate is fixedly connected on second straight edge of circular arc plate, the arcuate edge is in sliding contact with inner wall of groove body of arcuate groove, the first straight edge of circular arc plate can abut against lower surface of groove edge; the upper end of side cover is detachably connected with upper cover.

10 Claims, 12 Drawing Sheets

(51) Int. Cl.
*F16M 11/42* (2006.01)
*B60B 3/00* (2006.01)
*B60B 25/10* (2006.01)
*B62B 3/10* (2006.01)

(56) References Cited

U.S. PATENT DOCUMENTS

| | | | | |
|---|---|---|---|---|
| 4,020,967 | A * | 5/1977 | Hammond | B65D 7/24 |
| | | | | 220/6 |
| 6,216,899 | B1 * | 4/2001 | Vicari | B65D 19/16 |
| | | | | 206/600 |
| 8,848,379 | B2 * | 9/2014 | He | H01R 12/721 |
| | | | | 361/737 |
| 9,518,747 | B2 * | 12/2016 | Lee | F24F 13/20 |

* cited by examiner

Wheel
LED DISPLAY BOX TRANSPORT CART

TECHNICAL FIELD

The invention belongs to the technical field of transportation and relates to an LED display box transport cart.

BACKGROUND

With the development of LED display technology, large LED display screens are more and more widely used in various public places. Large LED display screens are usually formed by splicing several boxes, to facilitate transportation and installation. During the transportation of the LED display box to the installation site, due to the complex and changeable environment of the site, bumps, vibrations and other impacts or damages will inevitably occur.

In order to avoid bumping or damaging the LED display box, in the prior art, the transportation of the LED display box is generally realized by transport vehicles. However, the existing transport vehicles usually connect the frames by screwing or welding, which is complicated and time-consuming.

SUMMARY

The technical problem to be solved by the invention is to provide an LED display box transport cart aiming at the technical problem of the complicated and time-consuming connection process of the existing transport vehicles.

In order to solve the above technical problems, the embodiment of the present invention provides an LED display box transport cart, comprising: a transport frame and wheels detachably and rotatably connected to the bottom of the transport frame. Wherein the transport frame comprises a chassis, an upper cover and two side covers symmetrically arranged between the chassis and the upper cover, the chassis is provided with an arcuate groove with an upward opening. The arcuate groove includes a groove body, and a first edge and a second edge symmetrically disposed at the opening of the groove body, the first edge extends toward the second edge to form a groove edge;

The lower end of the side cover corresponding to the position of the arcuate groove is provided with a hook, the hook comprises a rectangular plate and a circular arc plate, the circular arc plate is rotatably connected in the arcuate groove, the circular arc plate comprises a first straight edge, a second straight edge and an arcuate edge which are connected end to end, the lower edge of the rectangular plate is fixedly connected on the second straight edge, the arcuate edge is in sliding contact with the inner wall of the groove body, and the first straight edge can abut against the lower surface of the groove edge;

the upper end of the side cover is detachably connected with the upper cover.

According to the LED display box transport cart of the embodiment of the invention, the lower end of side cover is in sliding contact with the inner wall of groove body of arcuate groove on chassis through the arcuate edge of circular arc plate, and abuts against the lower surface of groove edge on chassis through the first straight edge of circular arc plate, so that the lower end of side cover is connected with chassis, and the upper end of side cover is detachably connected with upper cover, wheels are detachably and rotatably connected to the bottom of the transport frame, so that the LED display box transport cart can be assembled more conveniently and quickly, and the time required for assembling the LED display box transport cart can be effectively saved. In addition, the setting of the connection type of wheel can facilitate transportation and stacking of transport frames.

Alternatively, the length of the groove edge is smaller than the length of the first straight edge.

Alternatively, the transport frame further comprises an inner frame, the inner frame comprises a horizontal post, and two vertical posts fixed at both ends of the horizontal post. The lower end of the vertical post is fixedly connected to the chassis, the two vertical posts correspond to the two side covers one to one, and the corresponding vertical posts and the side covers are connected through a bolt.

Alternatively, the side cover comprises a limit plate, and two connecting plates arranged on both sides of the limit plate in parallel, and the hook is arranged at the lower end of the connecting plate. The limit plate and vertical post are connected through the bolt, the limit plate extends to the interior of the transport frame to form a plurality of limiter ends, a gap for the LED display box to vertically pass through is formed between two adjacent limiter ends, and the distance between two adjacent limiter ends is equal.

Alternatively, the transport frame further comprises a buckle assembly, the buckle assembly includes a buckle bracket, a buckle handle and a buckle lock. The bucket bracket is fixedly connected to the upper end of the connecting plate, the bucket handle is rotatably connected to the bucket bracket through a first rotating shaft, and one end of the buckle lock is rotatably connected to the bucket handle through a second rotating shaft;

The position of the upper cover corresponding to the buckle assembly is provided with a positioning piece, and the positioning piece is provided with a first positioning slot for locking the buckle lock;

Operating the bucket handle can enable the bucket lock to rotate around the second rotating shaft relative to the bucket handle, so that the bucket lock is locked in the positioning slot or disengaged from the positioning slot.

Alternatively, of the two side covers, one side cover is located on the left side of the transport frame, the other side cover is located on the right side of the transport frame;

of the two connecting plates of the side cover, one connecting plate is located on the front side of the limit plate, the other connecting plate is located on the rear side of the limit plate.

Alternatively, a plurality of locking assemblies are arranged side by side on the chassis, and the locking assembly comprises a chassis connector lock and a guide post. The central axis of the chassis connector lock is parallel to the central axis of the guide post, the central axis of the chassis connector lock is perpendicular to the chassis. The guide post is used for providing guidance to the LED display box along the height direction of the transport frame, and the chassis connector lock is used for locking the bottom of the LED display box on the chassis.

Alternatively, the chassis connector lock comprises an interlock upper block and an interlock lower block. The interlock lower block is fixed on the chassis, the interlock upper block is rotatably connected to the interlock lower block, and the cross section of the interlock upper block is rectangular;

The chassis connector lock has a locking state and an unlocking state, and in the unlocking state of the chassis connector lock, the bottom of the LED display box can pass through the interlock upper block and be sleeved on the interlock lower block; in the locking state of the chassis connector lock, the interlock upper block rotates relative to the interlock lower block, so as to lock the bottom of the LED display box.

Alternatively, the LED display box transport cart further comprises a wheel support, the wheel is rotatably connected to the lower end of the wheel support, and the upper end of the wheel support is detachably connected to the chassis.

Alternatively, the LED display box transport cart comprises a plurality of transport frames stacked along the height direction of the transport frames, of the plurality of the transport frames, the wheel is rotatably connected to the bottom of the lowermost transport frame;

In the two adjacent transport frames, the upper surface of the upper cover of the lower transport frame is provided with a plurality of second positioning slots with upward openings, and the lower surface of the chassis of the upper transport frame is provided with a plurality of downward bumps, the plurality of the bumps are correspondingly inserted into the plurality of the second positioning slots one to one.

REFERENCE NUMERALS IN THE SPECIFICATION ARE AS FOLLOWS

Figure 1:
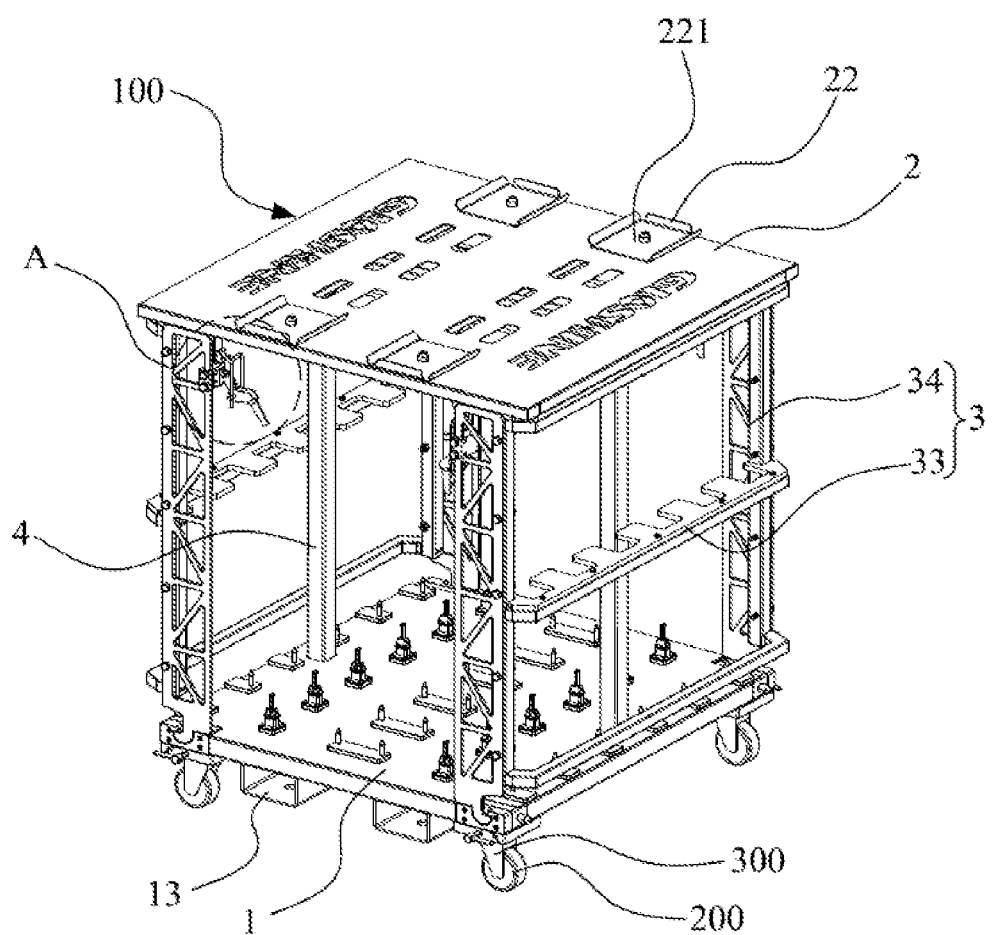
FIG. 1 is a schematic diagram of the LED display box transport cart according to an embodiment of the present invention.

100. Transport frame;
100. Transport frame;

1. Chassis; 11. Arcuate groove; 111. Groove body; 112. Groove edge; 12. First connecting seat; 121. First through hole; 13. Bump;
2. Upper cover; 21. Positioning piece; 211. First positioning slot; 22. Positioning plate; 221. Second positioning slot;
3. Side cover; 31. Hook; 311. Rectangular plate; 312. Circular arc plate; 3121. First straight edge; 3122. Arcuate edge; 32. First connecting sheet; 321. First insertion hole; 33. Limit plate; 331. Limiter end; 34. Connecting plate;
4. Inner frame; 41. Horizontal post; 42. Vertical post; 43. Second connecting sheet; 431. Second insertion hole;
5. Bolt;
6. Buckle assembly; 61. Buckle bracket; 62. Buckle handle; 63. Buckle lock;
7. First rotating shaft;
8. Second rotating shaft;
9. Locking assembly; 91. Chassis connector lock; 911. Locking handle; 9111. Slot; 912. Third rotating shaft; 913. Marble screw; 914. Interlock upper block; 9141. Rotating slot; 91411. Slot bottom; 91412. Slot wall; 914121. First sidewall; 914122. Second sidewall; 914123. Third sidewall; 9142. Threaded rod; 915. Interlock lower block; 9151. Threaded hole; 9152. Connecting hole; 916. Fixed block; 9161. Fixing hole; 917. Fixing screw; 92. Guide post;
10. Connection handle; 101. Handle; 102. Insertion rod; 200. Wheel;
300. Wheel support; 301. Second connecting seat; 3011. Second through hole; 302. Support body;
400. LED display box; 401. Positioning through hole.

DETAILED DESCRIPTION OF THE EMBODIMENTS

In order to make the technical problem to be solved, technical solutions and beneficial effects of this application more clearly understood, the present invention will be described in further detail below with reference to the drawings and embodiments. It should be understood that the specific embodiments described herein are only for the purpose of illustration and are not intended to limit the scope of the present invention.

As shown in FIGS. 1 to 18, the LED display box transport cart provided by the embodiment of the present invention comprises: a transport frame 100 and wheels 200 detachably and rotatably connected to the bottom of the transport frame 100. Wherein the transport frame 100 comprises a chassis 1, an upper cover 2 and two side covers 3 symmetrically arranged between the chassis 1 and the upper cover 2, the chassis 1 is provided with an arcuate groove 11 with an upward opening. The arcuate groove 11 includes a groove body 111, and a first edge and a second edge symmetrically disposed at the opening of the groove body 111, the first edge extends toward the second edge to form a groove edge 112.

The lower end of the side cover 3 corresponding to the position of the arcuate groove 11 is provided with a hook 31, the hook 31 comprises a rectangular plate 311 and a circular arc plate 312, the circular arc plate 312 is rotatably connected in the arcuate groove 11, the circular arc plate 312 comprises a first straight edge 3121, a second straight edge and an arcuate edge 3122 which are connected end to end, the lower edge of the rectangular plate 311 is fixedly connected on the second straight edge, the arcuate edge 3122 is in sliding contact with the inner wall of the groove body 111, and the first straight edge 3121 can abut against the lower surface of the groove edge 112.

the upper end of the side cover 3 is detachably connected with the upper cover 2.

According to the LED display box transport cart of the embodiment of the invention, the lower end of the side cover 3 is in sliding contact with the inner wall of groove body 111 of arcuate groove 11 on the chassis 1 through arcuate edge 3122 of circular arc plate 312, and abuts against the lower surface of groove edge 112 on chassis 1 through the first straight edge 3121 of the circular arc plate 312, so that the lower end of the side cover 3 is connected with chassis 1, and the upper end of the side cover 3 is detachably connected with the upper cover 2, the wheels 200 are detachably and rotatably connected to the bottom of the transport frame 100, so that the LED display box transport cart can be assembled more conveniently and quickly, and the time required for assembling the LED display box transport cart can be effectively saved. In addition, the setting of the connection type of wheel 200 can facilitate transportation and stacking of transport frames 100.

Figure 6:
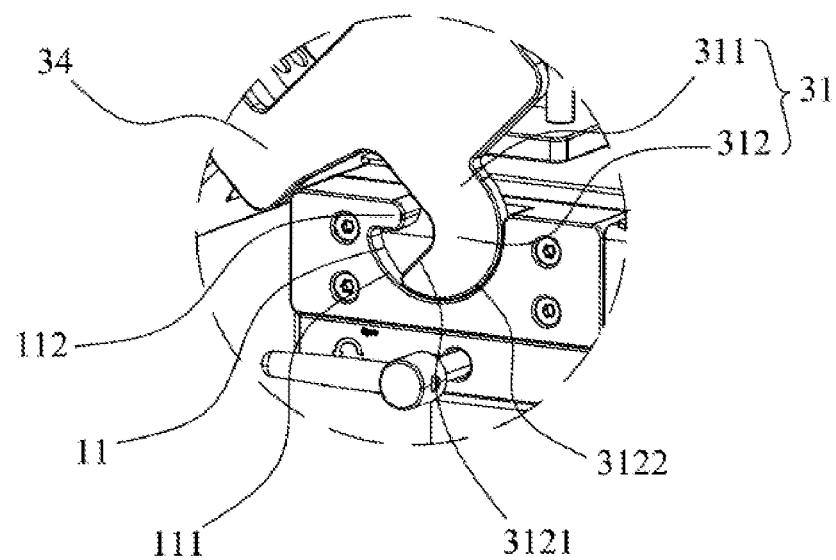
FIG. 6 is an enlarged view of C in FIG. 5.

In one embodiment, as shown in FIG. 6, the length of the groove edge 112 is smaller than the length of the first straight edge 3121. So that when the lower end of the side cover 3 is connected with the chassis 1, the hook 31 can be completely accommodated in the groove body 111, and the connection between the side cover 3 and the chassis 1 can be more stable.

Figure 4:
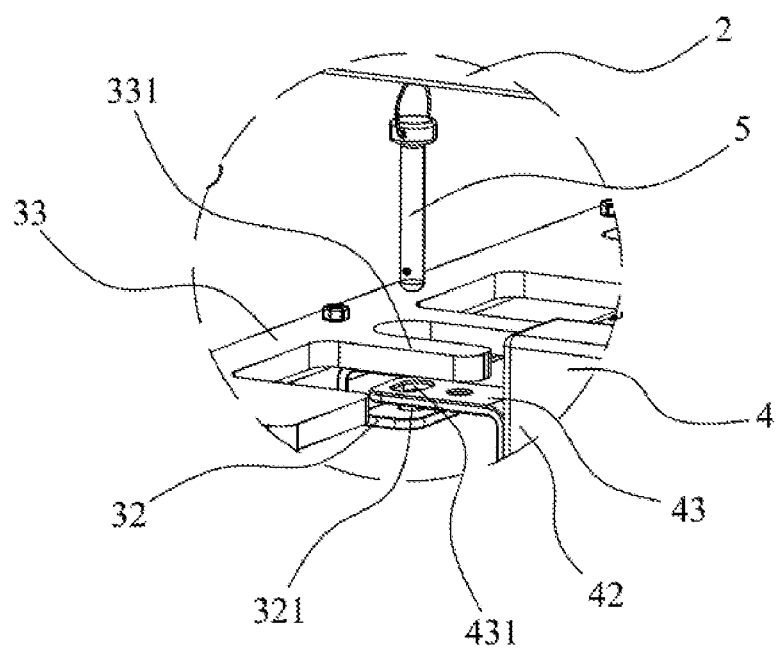
FIG. 4 is an enlarged view of B in FIG. 3.
Figure 5:
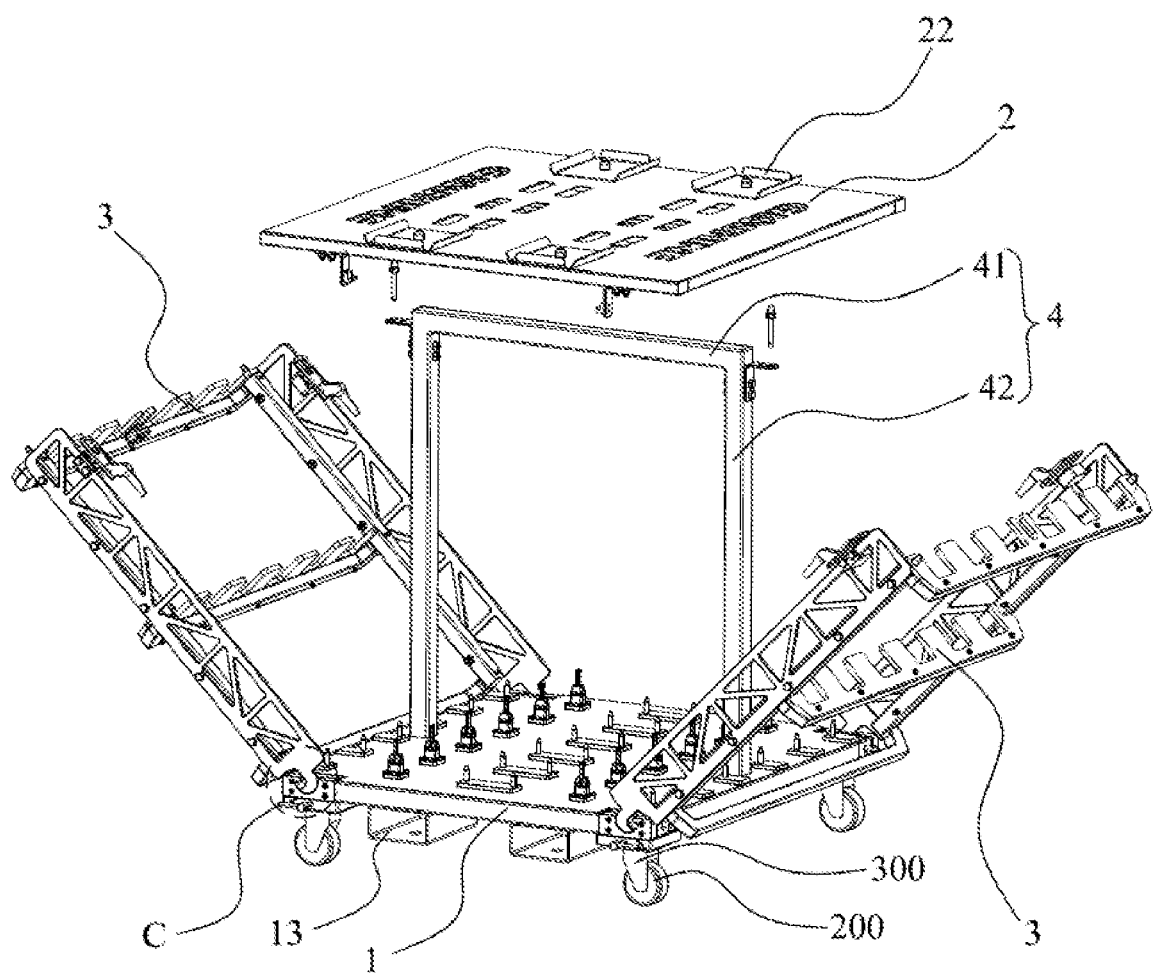
FIG. 5 is a schematic diagram of the LED display box transport cart with the upper cover disassembled, and the side cover and chassis connected, according to an embodiment of the present invention.

In one embodiment, as shown in FIG. 4, the transport frame 100 further includes an inner frame 4, the inner frame 4 comprises a horizontal post, and two vertical posts 41 fixed at both ends of the horizontal post 42. The lower end of the vertical post 42 is fixedly connected to the chassis 1, the two vertical posts 42 correspond to the two side covers 3 one to one, and the corresponding vertical posts 42 and the side covers 3 are connected through a bolt 5. Once the lower end of the side cover 3 is connected with the chassis 1, the side cover 3 can be further fixed by the inner frame 4 to make the side cover 3 more stable.

Specifically, the inner surface of the side cover 3 is fixedly connected to a first connecting sheet 32, and the outer sidewall of the vertical post 42 is fixedly connected to a second connecting sheet 43 at a position corresponding to the first connecting sheet 32. The first connecting sheet 32 is transversely bent toward the vertical post 42 to form a first connection end, the second connecting sheet 43 is transversely bent toward the side cover 3 to form a second connection end, and the first connection end is provided with a first insertion hole 321, the second connection end is provided with a second insertion hole 431 corresponding to the first insertion hole 321, and the bolt 5 passes through the first insertion hole 321 and the second insertion hole 431, so that the vertical post 42 and the side cover 3 can be connected through the bolt 5.

The bolt 5 comprises a fall-off preventing end and an insertion end located at the bottom of the fall-off preventing end. The insertion end can pass through the first insertion hole 321 and second insertion hole 431, and the cross-sectional area of the fall-off preventing end is larger than that of the first insertion hole 321 and second insertion hole 431.

In an embodiment not shown in the figure, the cross-sectional area of the fall-off preventing end may also be smaller than that of the first insertion hole 321 and second insertion hole 431, ensuring that the fall-off preventing end can be limited to a position above the first insertion hole 321 and second insertion hole 431 is all that is required.

Figure 3:
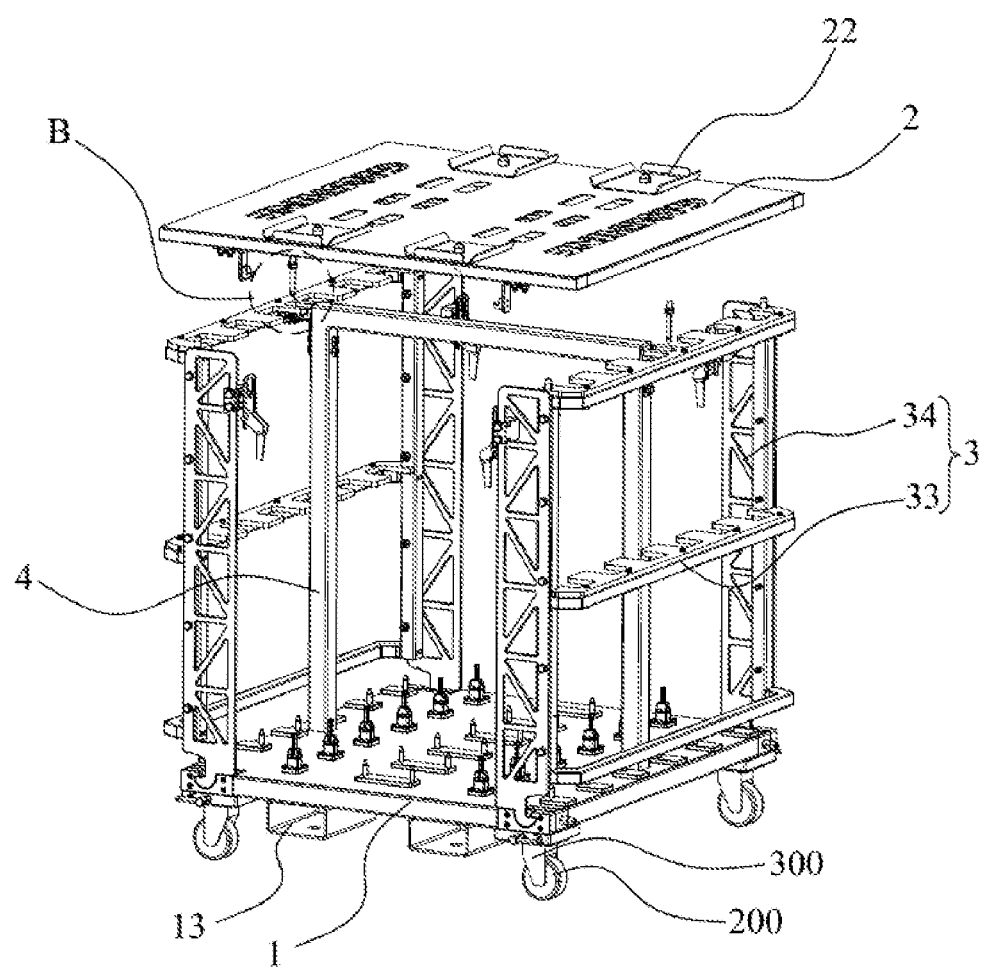
FIG. 3 is a schematic diagram of the LED display box transport cart with the upper cover disassembled according to an embodiment of the present invention.
Figure 12:
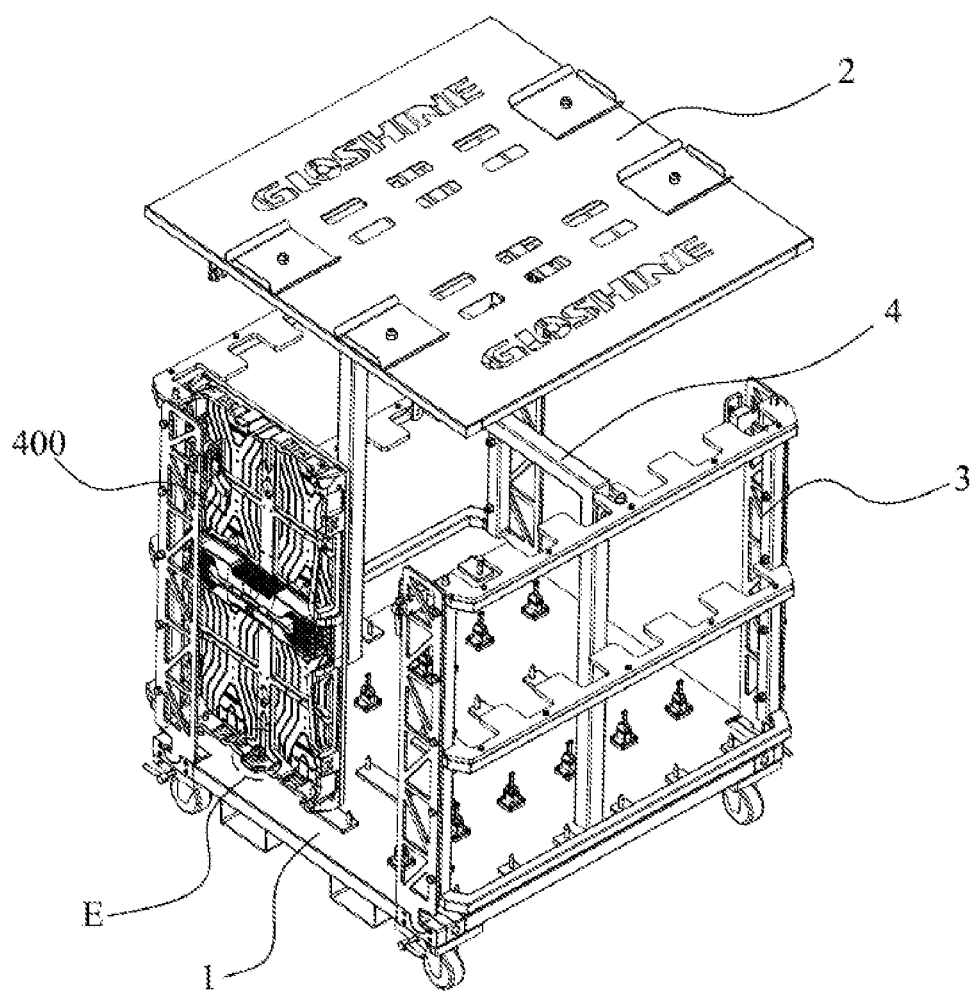
FIG. 12 is a first schematic diagram of the LED display box transport cart with the LED display box installed, according to an embodiment of the present invention.

In one embodiment, as shown in FIGS. 3 and 4, the side cover comprises a limit plate 33, and two connecting plates 34 arranged on both sides of the limit plate 33 in parallel, and the hook 31 is arranged at the lower end of the connecting plate 34. The limit plate 33 and vertical post 42 are connected through the bolt 5, the limit plate 33 extends to the interior of the transport frame 100 to form a plurality of limiter ends 331, a gap for the LED display box 400 (as shown in FIG. 12) to vertically pass through is formed between two adjacent limiter ends 331, and the distance between two adjacent limiter ends 331 is equal.

The first connecting sheet 32 is fixedly connected to the inner surface of the limit plate 33.

While allowing the LED display box 400 to vertically pass through, the gap can limit the LED display box 400 in the lateral direction, so as to prevent the LED display box 400 installed in the transport frame 100 from shaking and causing abrasion between two adjacent LED display boxes 400.

In the embodiment shown in FIGS. 1 to 18, two limit plates 33 are arranged between the two connecting plates 34 in parallel, and the LED display box 400 is limited by the two limit plates 33 together, so that the installation of the LED display box 400 is more stable.

Figure 2:
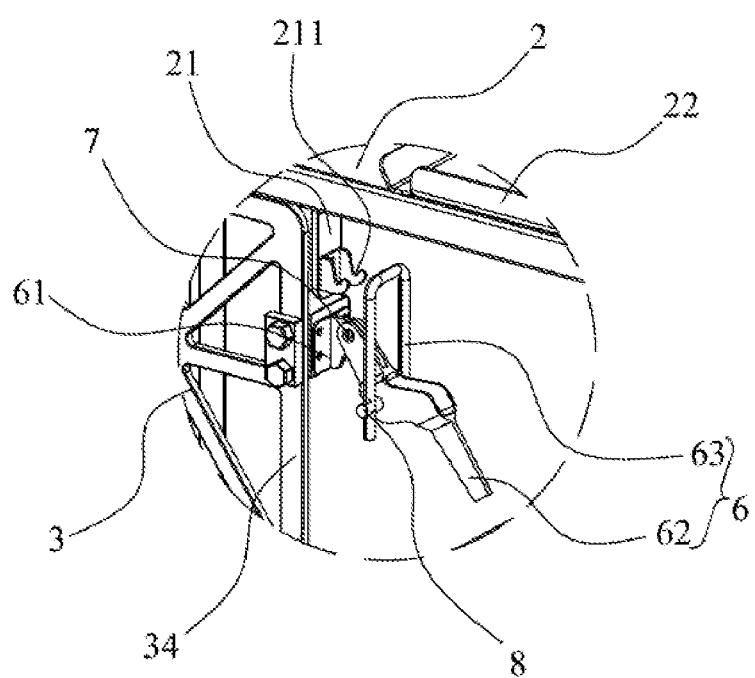
FIG. 2 is an enlarged view of A in FIG. 1.

In one embodiment, as shown in FIGS. 1 and 2, the transport frame 100 further comprises a buckle assembly 6, the buckle assembly 6 includes a buckle bracket 61, a buckle handle 62 and a buckle lock 63. The bucket bracket 61 is fixedly connected to the upper end of the connecting plate 34, the bucket handle 62 is rotatably connected to the bucket bracket 61 through a first rotating shaft 7, and one end of the buckle lock 63 is rotatably connected to the buckle handle 62 through a second rotating shaft 8.

The position of the upper cover 2 corresponding to the buckle assembly 6 is provided with a positioning piece 21, and the positioning piece 21 is provided with a first positioning slot 211 for locking the buckle lock 63.

Operating the bucket handle 62 can enable the bucket lock 63 to rotate around the second rotating shaft 8 relative to the bucket handle 62, so that the bucket lock 63 is locked in the first positioning slot 211 or disengaged from the first positioning slot 211, thereby controlling the connection between the upper cover 2 and the connecting plate 34.

As shown in FIG. 2, it is a state diagram of the buckle lock 63 being disengaged from the first positioning slot 211, in this state, the upper cover 2 is not connected to the connecting plate 34.

Figure 17:
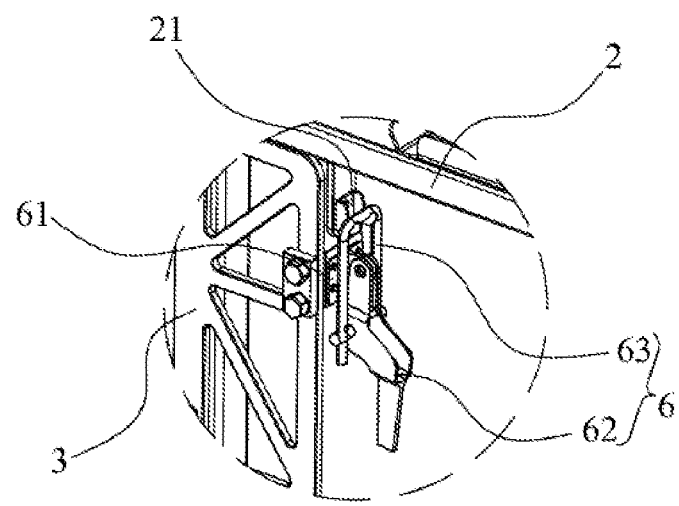
FIG. 17 is an enlarged view of G in FIG. 16.

As shown in FIG. 17, it is a state diagram of the buckle lock 63 being locked in the first positioning slot 211, in this state, the upper cover 2 is connected to the connecting plate 34.

In one embodiment, as shown in FIGS. 1 to 18, of the two side covers 3, one side cover 3 is located on the left side of the transport frame 100, the other side cover 3 is located on the right side of the transport frame 100.

Of the two connecting plates 34 of the side cover 3, one connecting plate 34 is located on the front side of the limit plate 33, the other connecting plate 34 is located on the rear side of the limit plate 33.

Correspondingly, in the embodiment shown in FIGS. 1 to 18, of the two vertical posts 42 of the inner frame 4, one vertical post 42 is located on the left side of the horizontal post 41, and the other vertical post 42 is located on the right side of the horizontal post 41. The vertical post 42 located on the left side of the horizontal post 41 is detachably connected with the side cover 3 located on the left side of the transport frame 100 through the bolt 5. The vertical post 42 located on the right side of the horizontal post 41 and the side cover 3 located on the right side of the transport frame 100 are detachably connected through the bolt 5, so that the two vertical posts 42 and the two side covers 3 correspond to each other one to one, and the connection between the vertical post 42 and the side cover 3 corresponding to each other is achieved.

Figure 7:
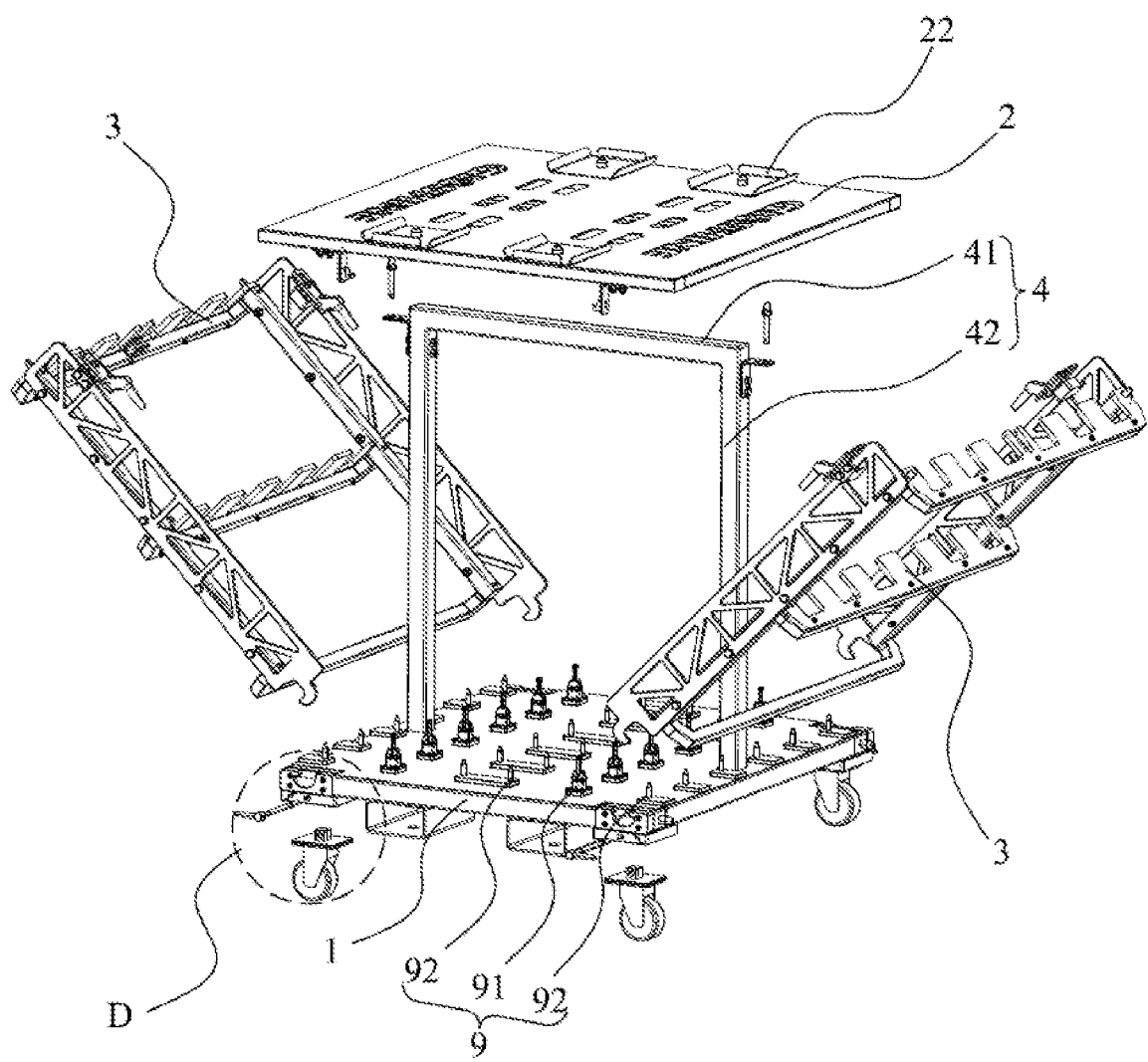
FIG. 7 is an exploded view of the LED display box transport cart according to an embodiment of the present invention.

In one embodiment, as shown in FIG. 7, a plurality of locking assemblies 9 are arranged side by side on the chassis 1, and the locking assembly 9 comprises a chassis connector lock 91 and a guide post 92. The central axis of the chassis connector lock 91 is parallel to the central axis of the guide post 92, the central axis of the chassis connector lock 91 is perpendicular to the chassis 1. The guide post 92 is used for providing guidance to the LED display box 400 along the height direction of the transport frame 100, and the chassis connector lock 91 is used for locking the bottom of the LED display box 400 on the chassis 1.

When the LED display box 400 is installed on the transport frame 100, the LED display box 400 can be inserted into the transport frame 100 from above. Through the guiding effect of the guide post 92 on the LED display box 400, the guide post 92 is inserted into the bottom end of the LED display box 400, and then the bottom end of the LED display box 400 is locked by the chassis connector lock 91, so that the LED display box 400 is installed in the transport frame 100, and the installation stability of the LED display box 400 is ensured.

In the embodiment shown in FIG. 7, the left and right sides of the chassis connector lock 91 are respectively provided with a guide post 92, through the combined guidance of the two guide posts 92, the positioning of the LED display box 400 in the transport frame 100 is more accurate, and it is convenient for the chassis connector lock 91 to lock the bottom end of the LED display box 400.

Figure 9:
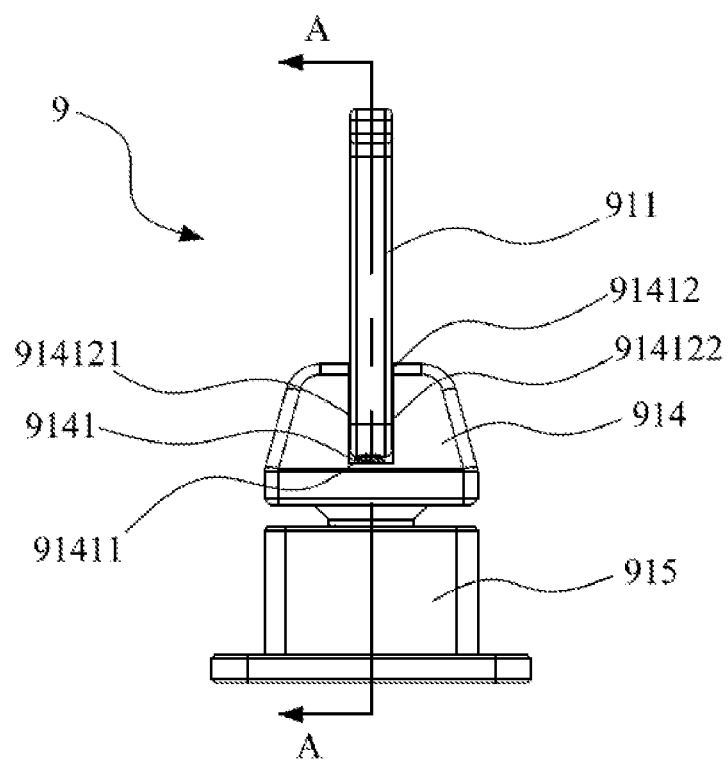
FIG. 9 is a schematic diagram of the chassis connector lock of the LED display box transport cart according to an embodiment of the present invention.
Figure 10:
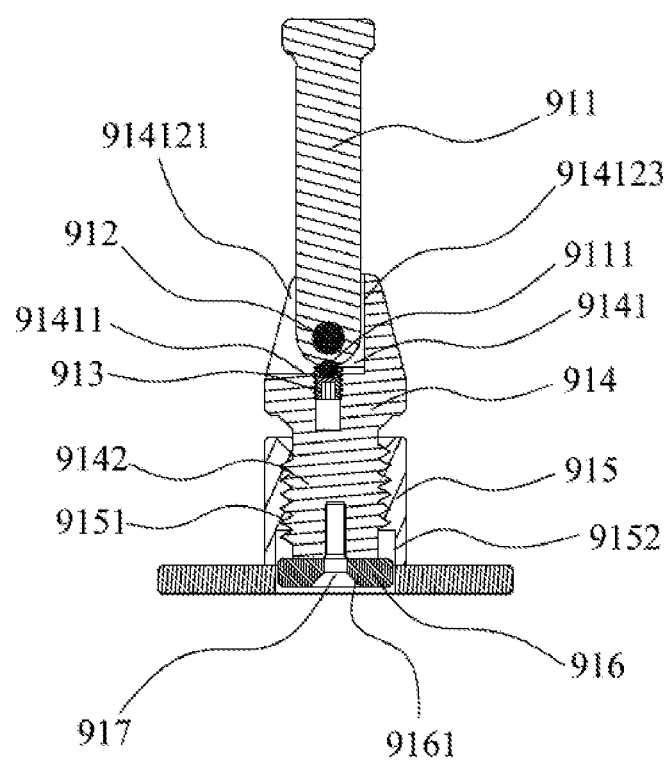
FIG. 10 is a sectional view of A-A in FIG. 9.
Figure 11:
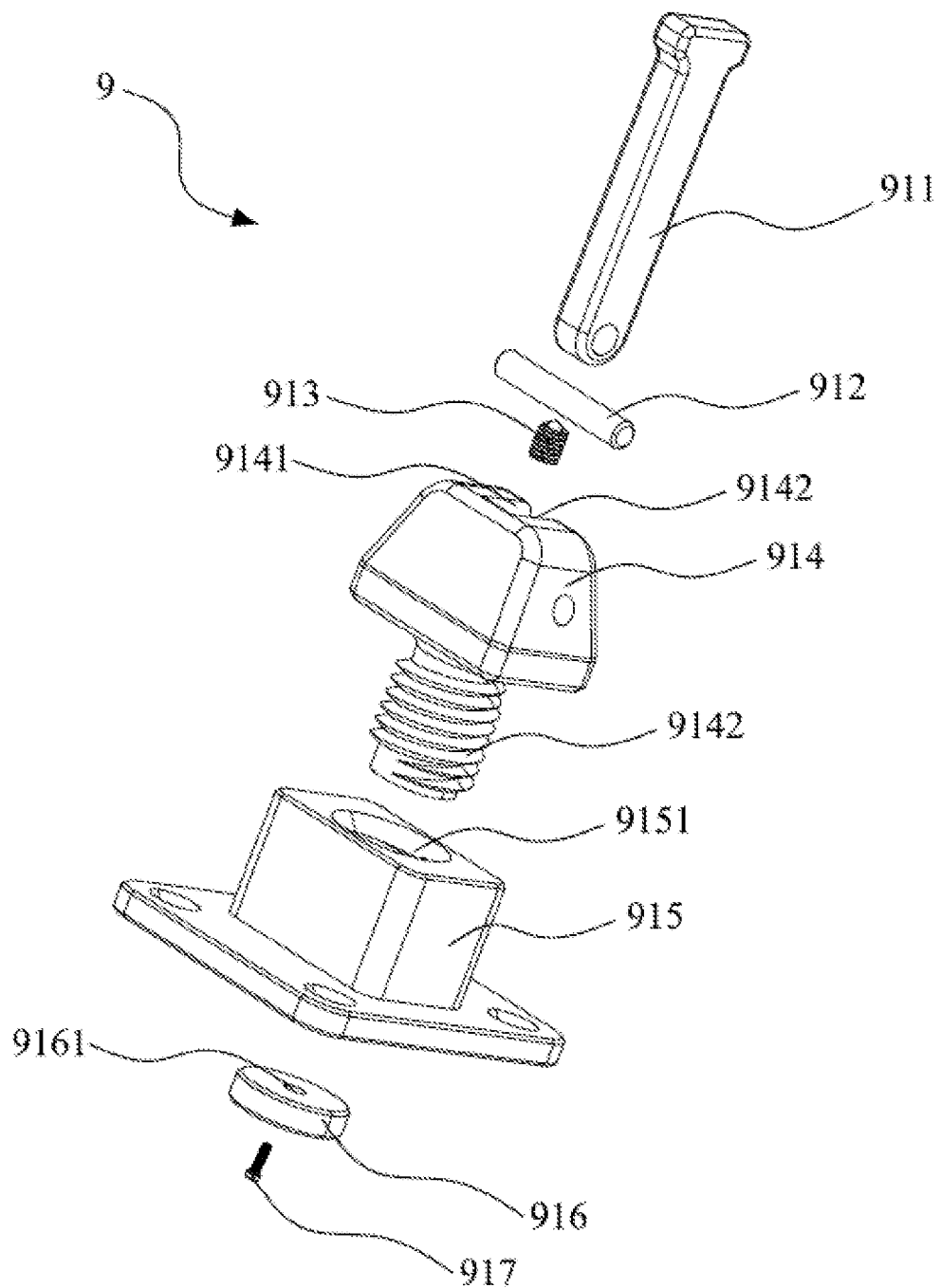
FIG. 11 is an exploded view of the chassis connector lock of the LED display box transport cart according to an embodiment of the present invention.

In one embodiment, as shown in FIGS. 9 to 11, the chassis connector lock 91 comprises an interlock upper block 914 and an interlock lower block 915. The interlock lower block 915 is fixed on the chassis 1, the interlock upper block 914 is rotatably connected to the interlock lower block 915, the cross section of the interlock upper block 914 is rectangular, and the cross section of the interlock lower block 915 is rectangular.

The chassis connector lock has a locking state and an unlocking state, and in the unlocking state of the chassis connector lock 91, the bottom of the LED display box 400 can pass through the interlock upper block 914 and be sleeved on the interlock lower block 915. In the locking state of the chassis connector lock 91, the interlock upper block 914 rotates relative to the interlock lower block 915, so as to lock the bottom of the LED display box 400.

The bottom of the LED display box 400 is provided with a rectangular positioning through hole 401. In the unlocking state of the chassis connector lock 91. The interlock lower block 915 may be located in the positioning through hole 401 and the interlock upper block 914 may be located above the positioning through hole 401. In this state, the long side of the cross section of the interlock upper block 914 is parallel to the long side of the positioning through hole 401.

Operating the interlock upper block 914 to enable the interlock upper block 914 to rotate relative to the interlock lower block 915, the long side of the cross section of the interlock upper block 914 intersects with the long side of the positioning through hole 401, and the interlock upper block 914 partially presses against the edge of the position where the positioning through hole 401 is provided on the LED display box 400, so that the LED display box 400 is installed in the transport frame 100 through the bottom of the LED display box 400.

In the embodiment shown in FIGS. 9 to 11, the lower end of the interlock upper block 914 is provided with a threaded rod 9142, the interlock lower block 915 is provided with a threaded hole 9151 extending in the vertical direction, and the threaded rod 9142 is threadedly connected in the threaded hole 9151.

Operating the interlock upper block 914, the threaded engagement between the threaded rod 9142 and threaded hole 9151 can enable the interlock upper block 914 to rotate relative to the interlock lower block 915, so as to lock the LED display box 400.

In one embodiment, as shown in FIGS. 9 to 11, the chassis connector lock 91 further comprises a fixed block 916 and a fixed screw 917, the fixed block 916 is provided with a fixed hole 9161, the fixed screw 917 passes through the fixed hole 9161 to fixedly connect to the lower end of the interlock upper block 914.

The interlock lower block 915 is provided with a connecting hole 9152 communicated with the threaded hole 9151 and positioned below the threaded hole 9151, the aperture of the connecting hole 9152 is larger than the aperture of the threaded hole 9151, and the fixed block 916 is positioned in the connecting hole 9152.

The fixed block 916 is located in the connecting hole 9152, and the fixing screw 917 passes through the fixed hole 9161 to fixedly connect to the lower end of the interlock upper block 914, thereby preventing the interlocking upper block 914 from falling off the interlock lower block 915.

In one embodiment, as shown in FIGS. 9 to 11, the chassis connector lock 91 further includes a locking handle 911, the locking handle 911 is rotatably connected to the interlock upper block 914 through a third rotating shaft 912. By setting the locking handle 911, the interlock upper block 914 can be conveniently operated to rotate the interlock upper block 914 relative to the interlock lower block 915.

In one embodiment, as shown in FIGS. 9 to 11, a rotating slot 9141 is provided on the sidewall of the interlock upper block 914, and the locking handle 911 is rotatably connected in the rotating slot 9141.

The slot bottom 91411 of the rotating slot 9141 is a horizontal plane, and the slot wall 91412 of the rotating slot 9141 is located above the slot bottom 91411. The slot wall 91412 includes a first sidewall 914121, a second sidewall 914122, and a third sidewall 914123 connected between the first sidewall 914121 and the second sidewall 914122. The first sidewall 914121, second sidewall 914122 and third sidewall 914123 are all vertical planes, the first sidewall 914121 is parallel to the second sidewall 914122, the second sidewall 914122 is perpendicular to the third sidewall 914123. The third rotating shaft 912 is connected between the first sidewall 914121 and the second sidewall 914122, so that the locking handle 911 can be rotatably connected in the rotating slot 9141.

In one embodiment, as shown in FIGS. 9 to 11, the chassis connector lock 91 further includes a marble screw 913, the marble screw 913 is fixedly connected to the slot bottom 91411 of the rotating slot 9141, and the end of one end of the locking handle 911 located in the rotating slot 9141 is provided with a slot 9111.

In the unlocking state of the chassis connector lock 91, the upper end of the marble screw 913 is clamped in the slot 9111, to prevent the locking handle 911 from swinging freely. In addition, since the locking handle 911 cannot swing freely in the unlocking state of the chassis connector lock 91, when installing the LED display box 400, without additional adjustment for the position of the locking handle 911, the positioning through hole 401 at the bottom of the LED display box 400 can be directly sleeved on the interlock lower block 915 from top to bottom. So that the locking handle 911 will not interfere with the installation of the LED display box 400 when the chassis connector lock 91 is in unlocking state, thus saving the installation time of the LED display box 400.

Figure 13:
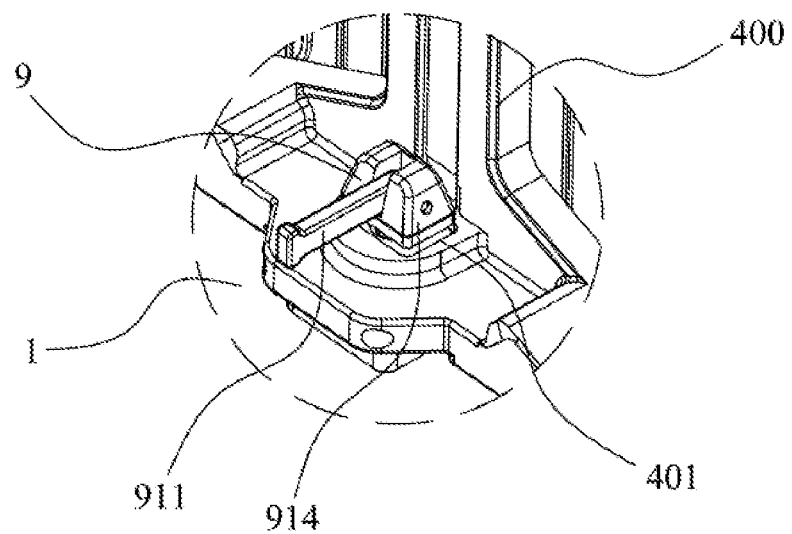
FIG. 13 is an enlarged view of E in FIG. 12.

The installation process of installing the LED display box 400 in the transport frame 100 is as follows:

(1) Remove the upper cover 2, align the LED display box 400 with the chassis connector lock 91 and guide post 92 on the chassis 1 and place it downward, until the positioning through hole 401 at the bottom of the LED display box 400 is sleeved on the interlock lower block 915. As shown in FIGS. 12 and 13, press down the locking handle 911, so that the chassis connector lock 91 can position and preliminary lock the bottom of the LED display box 400.

Figure 14:
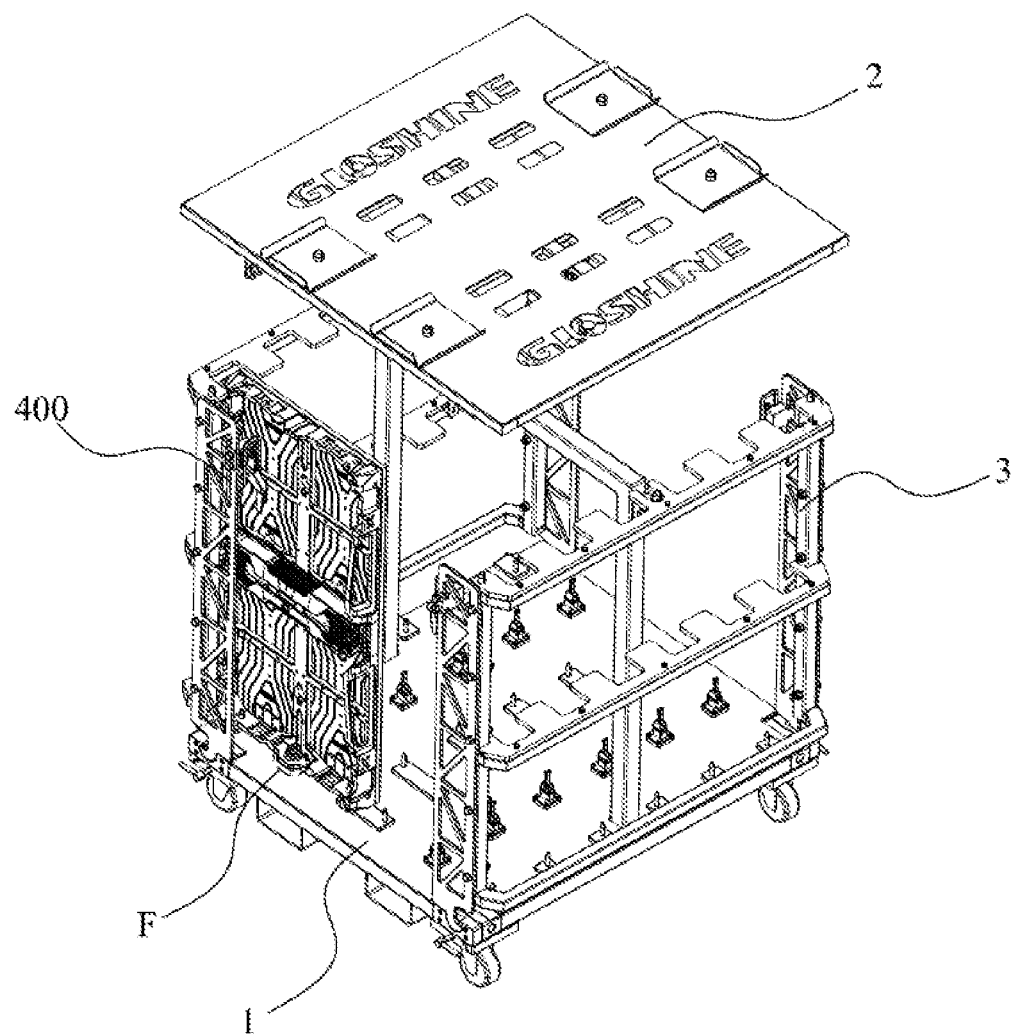
FIG. 14 is a second schematic diagram of the LED display box transport cart with the LED display box installed, according to an embodiment of the present invention.
Figure 15:
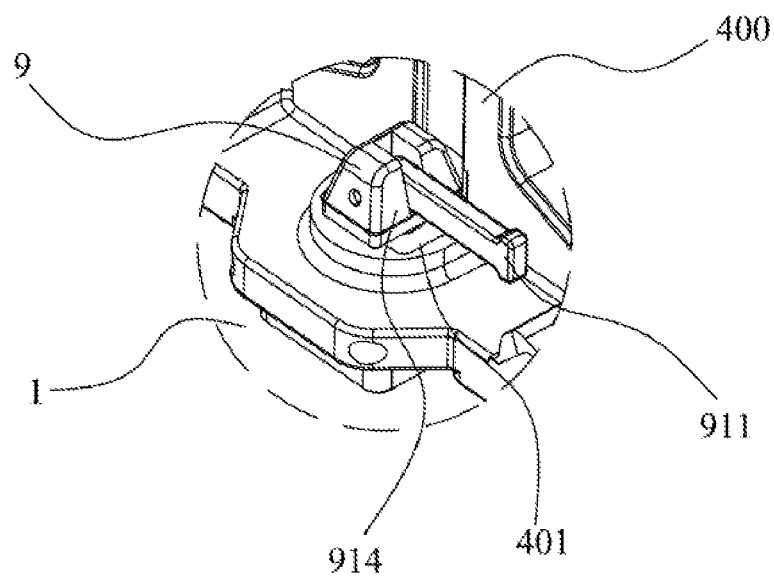
FIG. 15 is an enlarged view of F in FIG. 14.

(2) As shown in FIGS. 14 and 15, laterally rotate the locking handle 911, so that the interlock upper block 914 rotates relative to the interlock lower block 915, and the interlock upper block 914 partially presses against the edge of the position where the positioning through hole 401 is provided on the LED display box 400, thereby further locking the LED display box 400 and preventing the LED display box 400 from falling off the transport frame 100.

Figure 16:
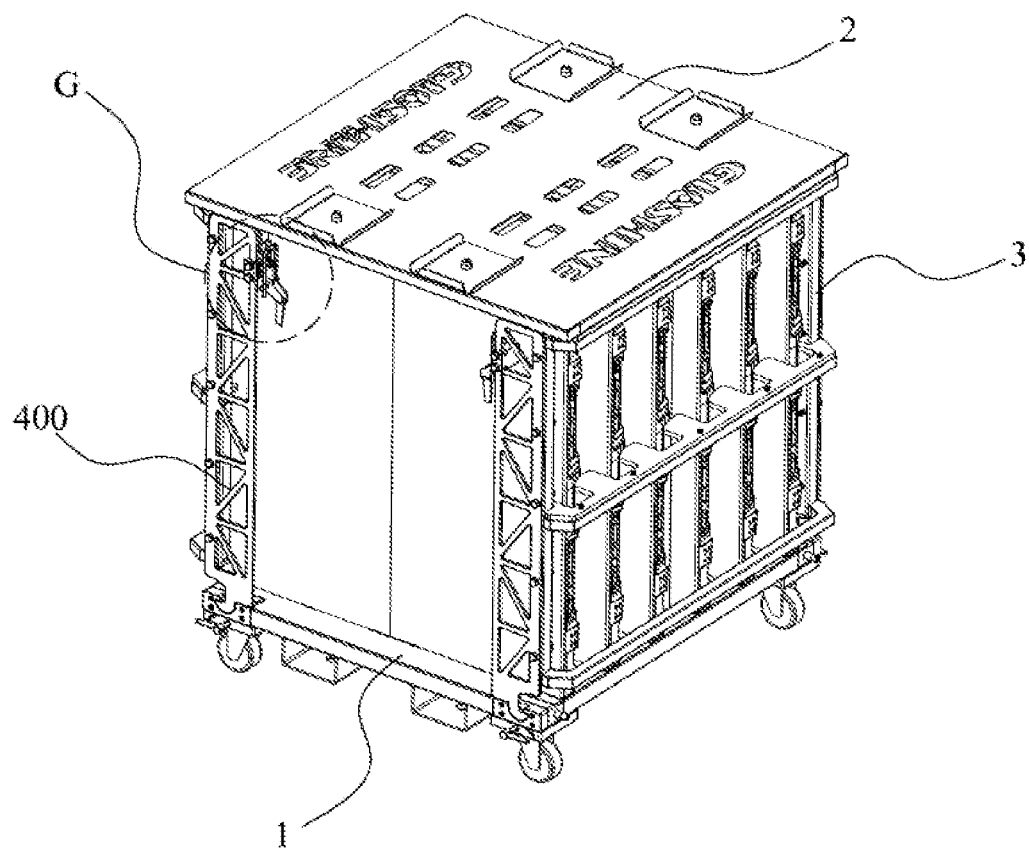
FIG. 16 is a third schematic diagram of the LED display box transport cart with the LED display box installed, according to an embodiment of the present invention.

(3) After the LED display box 400 is installed on the transport frame 100, as shown in FIGS. 16 and 17, cover the upper cover 2 and operate the buckle handle 62 of the buckle assembly 6, so that the buckle lock 63 is locked in the first positioning slot 211 of the positioning piece 21 on the upper cover 2, thereby the upper cover 2 is installed on the side cover 3, and the installation is completed.

Figure 8:
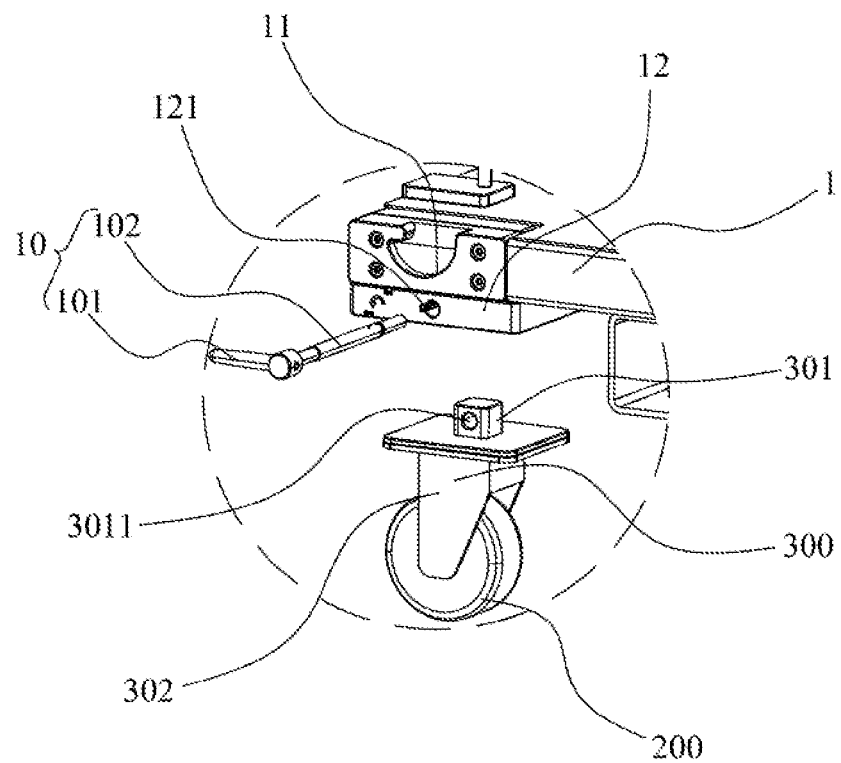
FIG. 8 is an enlarged view of D in FIG. 7.

In one embodiment, as shown in FIG. 8, the LED display box transport cart further comprises a wheel support 300, the wheel 200 is rotatably connected to the lower end of the wheel support 300, and the upper end of the wheel support 300 is detachably connected to the chassis 1.

Since the upper end of the wheel support 300 is detachably connected to the chassis 1, to stack a plurality of the transport frames 100, just need to detach the wheel support 300 from the chassis 1, then the wheel 200 rotatably connected to the lower end of the wheel support 300 can be detached, so as to facilitate stacking of the transport frames 100.

In one embodiment, as shown in FIG. 8, the lower surface of the chassis 1 is fixedly connected with a first connecting seat 12, and the first connecting seat 12 is provided with a first through hole 121 penetrating transversely, and a first accommodating hole (not shown) extending along the height direction of the first connecting seat 12. The wheel support 300 includes a support body 302 and a second connecting seat 301 fixedly connected above the support body 302, and the second connecting seat is provided with a second through hole 3011 penetrating transversely.

When the second connecting seat 301 is inserted into the first accommodating hole, the second through hole 3011 is communicated with the first through hole 121.

The LED display box transport cart further includes a connection handle 10, the connection handle 10 is inserted into the second through hole 3011 and the first through hole 121, so as to connect the wheel support 300 and the transport frame 100.

Preferably, the connection handle 10 includes a handle 101 and an insertion rod 102 fixed at one end of the handle 101. The insertion rod 102 is inserted into the second through hole 3011 and the first through hole 121. The insertion rod 102 is provided with a protrusion (not shown), rotating the handle 101 can make the protrusion snap into the second connecting seat 301, so as to prevent the second connecting seat 301 from falling off the first accommodating hole.

Figure 18:
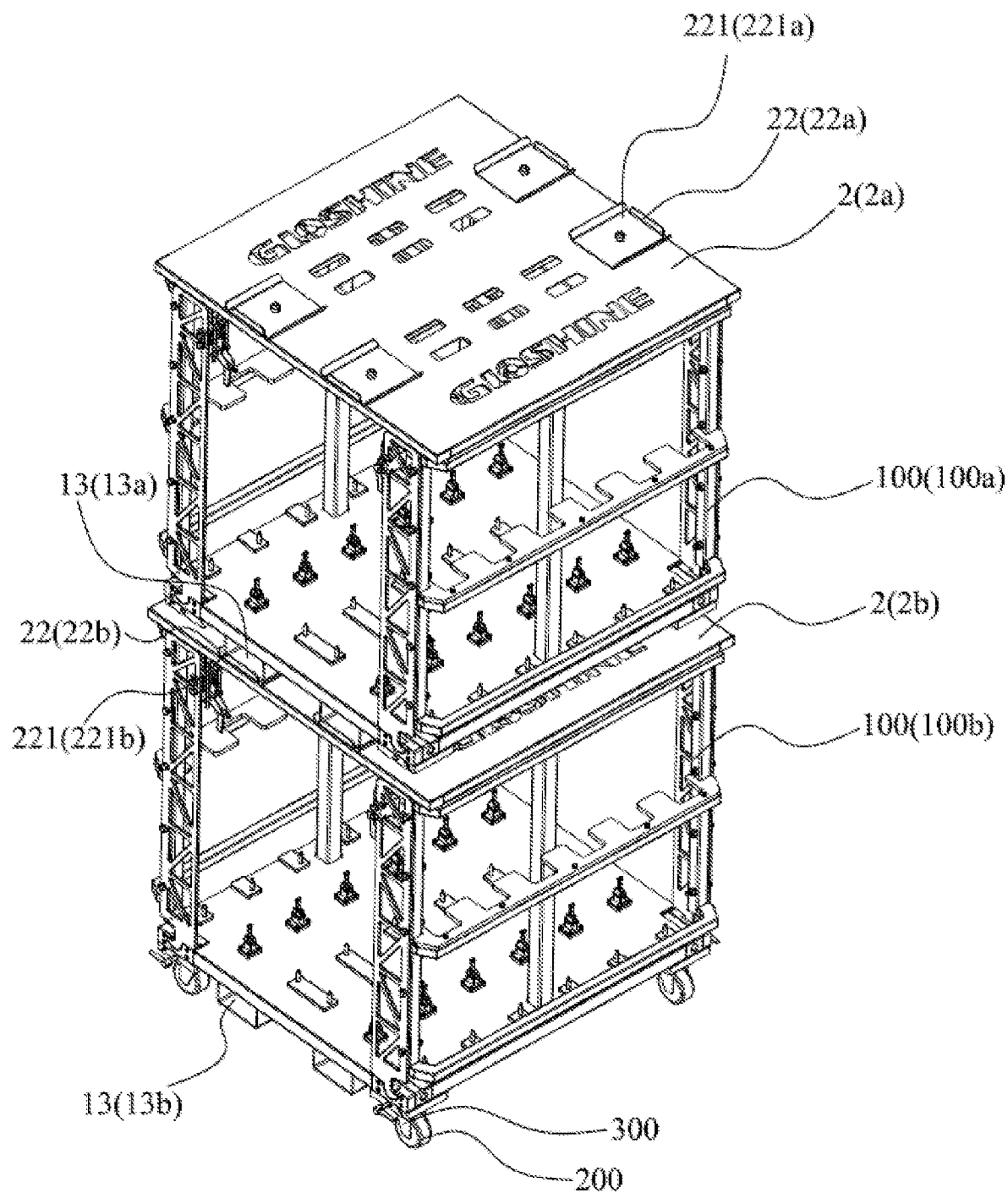
FIG. 18 is a third schematic diagram of the LED display box transport cart stacked, according to an embodiment of the present invention.

In one embodiment, as shown in FIG. 18, the LED display box transport cart includes a transport frame 100a and a transport frame 100b stacked along the height direction of the transport frame. The transport frame 100a is stacked above the transport frame 100b, and the wheel 200 is rotatably connected to the bottom of the transport frame 100b.

The upper cover 2b of the transport frame 100b is provided with a plurality of second positioning slots 221b with upward openings on the upper surface, the lower surface of chassis 1a of the transport frame 100a is provided with a plurality of bumps 13a protruding downward, and the plurality of bumps 13a are inserted into a plurality of second positioning slots 221b one to one correspondingly.

By inserting a plurality of the bumps 13a into a plurality of the second positioning slots 221b one to one correspondingly, the stacking between the transport frame 100a and the transport frame 100b is more stable, and the stacking process is simple and time-saving.

In the embodiment shown in FIG. 18, the upper surface of the upper cover 2b of the transport frame 100b is fixedly connected with a positioning plate 22b, and the edge of the positioning plate 22b is bent upward to enclose the second positioning slot 221b.

In an embodiment not shown in the figure, the LED display box transport cart may also include a plurality of the transport frames 100 stacked along the height direction of the transport frame, such as 3, 5, 7, etc. Of the plurality of the transport frames 100, the wheel 200 is rotatably connected to the bottom of the lowermost transport frame 100. The stacking mode between two adjacent transport frames 100 is the same as that shown in FIG. 18.

The above descriptions are only preferred embodiments of the present invention and are not intended to limit the scope of the present invention. Any modifications, equivalent replacement and improvements made within the spirit and principles of the present invention shall be included within the scope of protection of the present invention.

What is claimed is:

1. An LED display box transport cart, comprising: a transport frame and wheels detachably and rotatably connected to the bottom of the transport frame; wherein the transport frame comprises a chassis, an upper cover and two side covers symmetrically arranged between the chassis and the upper cover, the chassis is provided with an arcuate groove with an upward opening; the arcuate groove includes a groove body, and a first edge and a second edge symmetrically disposed at the opening of the groove body, the first edge extends toward the second edge to form a groove edge;

a position at a lower end of the side cover facing the arcuate groove is provided with a hook, the hook comprises a rectangular plate and a circular arc plate, the circular arc plate is rotatably connected in the arcuate groove, the circular arc plate comprises a first straight edge, a second straight edge and an arcuate edge which are connected end to end, the lower edge of the rectangular plate is fixedly connected on the second straight edge, the arcuate edge is in sliding contact with the inner wall of the groove body, and the first straight edge can abut against the lower surface of the groove edge;

the upper end of the side cover is detachably connected with the upper cover.

2. The LED display box transport cart according to claim 1, wherein the length of the groove edge is smaller than that of the first straight edge.

3. The LED display box transport cart according to claim 1, wherein the transport frame further comprises an inner frame, the inner frame comprises a horizontal post, and two vertical posts fixed at both ends of the horizontal post; the lower end of the vertical post is fixedly connected to the chassis, the two vertical posts correspond to the two side covers one to one, and the corresponding vertical posts and the side covers are connected through a bolt.

4. The LED display box transport cart according to claim 3, wherein the side cover comprises a limit plate, and two connecting plates arranged on both sides of the limit plate in parallel, and the hook is arranged at the lower end of the connecting plate; the limit plate and vertical post are connected through the bolt, the limit plate extends to the interior of the transport frame to form a plurality of limiter ends, a gap for the LED display box to vertically pass through is formed between two adjacent limiter ends, and the distance between two adjacent limiter ends is equal.

5. The LED display box transport cart according to claim 4, wherein the transport frame further comprises a buckle assembly, the buckle assembly includes a buckle bracket, a buckle handle and a buckle lock; the bucket bracket is fixedly connected to the upper end of the connecting plate, the bucket handle is rotatably connected to the bucket bracket through a first rotating shaft, and one end of the buckle lock is rotatably connected to the bucket handle through a second rotating shaft;

the position of the upper cover corresponding to the buckle assembly is provided with a positioning piece, and the positioning piece is provided with a first positioning slot for locking the buckle lock;

operating the bucket handle can enable the bucket lock to rotate around the second rotating shaft relative to the bucket handle, so that the bucket lock is locked in the positioning slot or disengaged from the positioning slot.

6. The LED display box transport cart according to claim 4, wherein of the two side covers, one side cover is located on the left side of the transport frame, the other side cover is located on the right side of the transport frame;

of the two connecting plates of the side cover, one connecting plate is located on the front side of the limit plate, the other connecting plate is located on the rear side of the limit plate.

7. The LED display box transport cart according to claim 1, wherein a plurality of locking assemblies are arranged side by side on the chassis, and the locking assembly comprises a chassis connector lock and a guide post; the central axis of the chassis connector lock is parallel to the central axis of the guide post, the central axis of the chassis connector lock is perpendicular to the chassis; the guide post is used for providing guidance to the LED display box along the height direction of the transport frame, and the chassis connector lock is used for locking the bottom of the LED display box on the chassis.

8. The LED display box transport cart according to claim 7, wherein the chassis connector lock comprises an interlock upper block and an interlock lower block; the interlock lower block is fixed on the chassis, the interlock upper block is rotatably connected to the interlock lower block, and the cross section of the interlock upper block is rectangular;

the chassis connector lock has a locking state and an unlocking state, and in the unlocking state of the chassis connector lock, the bottom of the LED display box can pass through the interlock upper block and be sleeved on the interlock lower block; in the locking state of the chassis connector lock, the interlock upper block rotates relative to the interlock lower block, so as to lock the bottom of the LED display box.

9. The LED display box transport cart according to claim 1, wherein the LED display box transport cart further comprises a wheel support, the wheel is rotatably connected to the lower end of the wheel support, and the upper end of the wheel support is detachably connected to the chassis.

10. The LED display box transport cart according to claim 1, wherein the LED display box transport cart comprises a plurality of transport frames stacked along the height direction of the transport frames, of the plurality of the transport frames, the wheel is rotatably connected to the bottom of the lowermost transport frame;

in the two adjacent transport frames, the upper surface of the upper cover of the lower transport frame is provided with a plurality of second positioning slots with upward openings, and the lower surface of the chassis of the upper transport frame is provided with a plurality of downward bumps, the plurality of the bumps are correspondingly inserted into the plurality of the second positioning slots one to one.

* * * * *